US008034311B2

(12) United States Patent
Ikeda et al.

(10) Patent No.: US 8,034,311 B2
(45) Date of Patent: Oct. 11, 2011

(54) OXIDATION CATALYST AND EXHAUST-GAS PURIFICATION SYSTEM USING THE SAME

(75) Inventors: Masanori Ikeda, Akashi (JP); Naohiro Kato, Himeji (JP)

(73) Assignees: ICT Co., Ltd., Chuo-Ku, Osaka-Shi (JP); International Catalyst Technology, Inc., Auburn Hills, MI (US)

( * ) Notice: Subject to any disclaimer, the term of this patent is extended or adjusted under 35 U.S.C. 154(b) by 0 days.

(21) Appl. No.: 12/656,799

(22) Filed: Feb. 17, 2010

(65) Prior Publication Data

US 2010/0150800 A1    Jun. 17, 2010

Related U.S. Application Data

(62) Division of application No. 11/946,620, filed on Nov. 28, 2007, now abandoned.

(30) Foreign Application Priority Data

Nov. 29, 2006   (JP) .................................. 2006-322490

(51) Int. Cl.
| | | |
|---|---|---|
| B01D 53/00 | (2006.01) | |
| B01J 8/02 | (2006.01) | |
| B01J 23/00 | (2006.01) | |
| B01J 21/00 | (2006.01) | |
| B01J 20/00 | (2006.01) | |
| C01B 21/00 | (2006.01) | |
| C01B 23/00 | (2006.01) | |
| C01B 25/00 | (2006.01) | |
| C01B 31/00 | (2006.01) | |
| C01B 33/00 | (2006.01) | |
| C01B 35/00 | (2006.01) | |
| C01G 28/00 | (2006.01) | |
| C01G 30/00 | (2006.01) | |

(52) U.S. Cl. ..................... 423/213.5; 423/239.1; 502/66; 502/74; 502/87; 502/261; 502/262; 502/332; 502/333; 502/334; 502/339; 502/349; 502/350; 502/351; 502/355; 502/415; 502/439; 502/527.19

(58) Field of Classification Search .................... 502/66, 502/74, 87, 261, 262, 326, 327, 332, 333, 502/334, 339, 349, 350, 351, 355, 415, 439, 502/527.19; 423/213.5, 239.1
See application file for complete search history.

(56) References Cited

U.S. PATENT DOCUMENTS 3,397,154 A    8/1968  Talsma
(Continued)

FOREIGN PATENT DOCUMENTS

CN    1664322 A    9/2005
(Continued)

OTHER PUBLICATIONS

C. Scott Sluder et al., "Low Temperature Urea Decomposition and SCR Performance," SAE paper 2005-01-1858, 5 pages.
(Continued)

*Primary Examiner* — Cam N. Nguyen
(74) *Attorney, Agent, or Firm* — Buchanan Ingersoll & Rooney PC

(57) ABSTRACT

An oxidation catalyst that efficiently promotes oxidation of NO to $NO_2$ even in a low temperature range, and an exhaust-gas purification system and method that efficiently removes exhaust-gas components even in a low temperature range are provided. This invention provides an oxidation catalyst comprising platinum and palladium as catalytically active components, which promotes oxidation of nitrogen monoxide to nitrogen dioxide, wherein the oxidation catalyst comprises 1 to 55 parts by weight of the palladium relative to 100 parts by weight of the platinum.

8 Claims, 8 Drawing Sheets

U.S. PATENT DOCUMENTS

| | | | |
|---|---|---|---|
| 3,488,150 A | | 1/1970 | Kabisch et al. |
| 4,049,576 A | | 9/1977 | Kovach et al. |
| 4,157,316 A | | 6/1979 | Thompson et al. |
| 4,171,287 A | | 10/1979 | Keith |
| 4,536,482 A | | 8/1985 | Carcia |
| 4,808,394 A | | 2/1989 | Kolts et al. |
| 4,902,487 A | | 2/1990 | Cooper et al. |
| 4,912,776 A | | 3/1990 | Alcorn |
| 5,275,997 A | | 1/1994 | Ganguli et al. |
| 5,856,263 A | | 1/1999 | Bhasin et al. |
| 6,030,921 A | | 2/2000 | Ziemer |
| 6,546,717 B1 * | 4/2003 | Chandler et al. ............... 60/274 |
| 6,555,081 B2 * | 4/2003 | Hori et al. ................ 423/239.1 |
| 6,685,897 B1 * | 2/2004 | Penetrante et al. ........ 423/213.2 |
| 6,696,031 B1 * | 2/2004 | Twigg et al. ................. 423/212 |
| 6,699,448 B2 * | 3/2004 | Wu et al. .................. 423/239.1 |
| 6,764,665 B2 * | 7/2004 | Deeba et al. ............... 423/239.1 |
| 6,948,308 B2 * | 9/2005 | Chandler et al. .............. 60/274 |
| 7,041,263 B2 * | 5/2006 | Sung ........................ 423/239.1 |
| 7,384,612 B2 * | 6/2008 | Ajisaka et al. ............... 422/177 |
| 7,390,768 B2 | 6/2008 | Jordan et al. |
| 7,413,720 B2 * | 8/2008 | Ott ............................ 423/239.1 |
| 7,422,731 B2 * | 9/2008 | Nakatsuji et al. .......... 423/239.1 |
| 7,462,338 B2 * | 12/2008 | Southward ................. 423/213.5 |
| 7,485,270 B2 * | 2/2009 | Twigg et al. ............... 423/213.2 |
| 7,576,031 B2 | 8/2009 | Beutel et al. |
| 7,704,473 B2 * | 4/2010 | Ikeda et al. ................. 423/213.2 |
| 7,740,817 B2 | 6/2010 | Matsumoto et al. |
| 7,763,222 B2 * | 7/2010 | Miyairi et al. ............. 423/239.1 |
| 2002/0039550 A1 | 4/2002 | Schafer-Sindlinger et al. |
| 2003/0139290 A1 | 7/2003 | Jordan et al. |
| 2004/0115111 A1 * | 6/2004 | Twigg ........................ 423/239.1 |
| 2004/0168429 A1 | 9/2004 | Dosaka et al. |
| 2005/0266988 A1 | 12/2005 | Doumeki et al. |
| 2009/0137386 A1 | 5/2009 | Pfeifer et al. |

FOREIGN PATENT DOCUMENTS

| | | |
|---|---|---|
| CN | 1630556 A | 6/2010 |
| EP | 1864713 A1 | 12/2007 |
| JP | 01-318715 A | 12/1989 |
| JP | 2002-001067 A | 1/2002 |
| JP | 2004-169643 A | 6/2004 |
| WO | WO2006/021337 A1 | 3/2006 |
| WO | WO2006/109417 A1 | 10/2006 |
| WO | WO2008/064152 A2 | 5/2008 |

OTHER PUBLICATIONS

Barry J. Cooper et al., Role of NO in Diesel Particulate Emission Control, SAE paper 890404, pp. 171-183.

Official Action dated Jan. 19, 2011, issued by the Chinese Patent Office in corresponding Chinese Patent Application No. 200710168180.4, and partial English language translation of the Official Action.

Graham et al, "Effect of Alloy Composition on Dispersion Stability and Catalytic Activity for NO Oxidation Over Alumina-Supported Pt-Pd Catalysts", Catalysis Letters, vol. 116, Nos. 1-2, 2007, pp. 1-8.

European Search Report dated Jul. 13, 2010 issued in corresponding European Patent Application No. EP 07121455.

* cited by examiner

OXIDATION CATALYST AND EXHAUST-GAS PURIFICATION SYSTEM USING THE SAME

CROSS-REFERENCE TO RELATED APPLICATIONS

The present application is a divisional of U.S. application Ser. No. 11/946,620 filed Nov. 28, 2007, now abandoned, which in turn claims priority from Japanese Patent Application No. 2006-322490 filed Nov. 29, 2006, the entire contents of which are incorporated hereinto by reference.

BACKGROUND OF THE INVENTION

1. Field of the Invention

The present invention relates to an oxidation catalyst and an exhaust-gas purification system using the same, and in particular, to an exhaust-gas purification system having excellent performance in purifying particularly nitrogen oxides from an internal combustion engine such as a diesel engine.

2. Description of Related Art

As a method for purifying nitrogen oxides discharged from an internal combustion engine such as a diesel engine, a method of installing a reduction catalyst along the flow of an exhaust gas and purifying $NO_x$ on a reduction catalyst by a reducing agent supplied from front of the reduction catalyst has drawn attention. Ammonia ($NH_3$), urea (($NH_2$)$_2$CO), a hydrocarbon such as light oil, and the like are used as the reducing agent. It is known that the reaction for purifying $NO_x$ proceeds via $NO_2$ using any of the above reducing agents. It is known, for example, that the reaction for purifying nitrogen oxides using urea proceeds mostly according to following formulae (1) to (4) and that formula (2) known as standard-SCR (selective catalytic reduction) is a slower reaction than formula (3) known as fast-SCR(C. Scott Sluder, et al., Low Temperature Urea Decomposition and SCR Performance, SAE paper 2005-01-1858).

Most of the nitrogen oxides in the exhaust gas discharged from an engine are NO when the engine is running at a low output (low speed) (that is, when the exhaust gas is at low temperature), while the equimolar amounts of NO and $NO_2$ react in formula (3). It is considered, therefore, that the reaction of formula (3) is promoted by making the molar ratio of $NO_2$ to NO close to 1:1 by forming $NO_2$ when the exhaust gas is at low temperature.

$$(NH_2)_2CO+H_2O \rightarrow 2NH_3+CO_2 \tag{1}$$

$$4NH_3+4NO+O_2 \rightarrow 4N_2+6H_2O \tag{2}$$

$$2NH_3+NO+NO_2 \rightarrow 2N_2+3H_2O \tag{3}$$

$$2NO_2+4NH_3+O_2 \rightarrow 3N_2+6H_2O \tag{4}$$

$$2NO+O_2 \rightarrow 2NO_2 \tag{5}$$

A method of making use of plasma is known as a technology for forming $NO_2$. A method for decreasing particulate matters in an exhaust gas by using nitrogen dioxide and ozone formed by means of generating plasma in the exhaust gas is disclosed (US-A-2004-168429 (JP-A-2004-169643)).

Another technology for forming $NO_2$ is a technology of using an oxidation catalyst to promote the reaction of the above formula (5). For example, platinum (Pt), palladium (Pd), ruthenium (Ru), rhodium (Rh) and the like are proposed as a active component of a catalyst for oxidizing NO in the exhaust gas to $NO_2$ in pursuit of removing diesel particulates (particulate matters) in U.S. Pat. No. 4,902,487 (JP-A-1-318715). Specific data on the metals other than Pt, however, are not disclosed. In addition, in "Barry J. Cooper, et al., Role of NO in Diesel Particulate Emission Control, SAE paper, 890404", it is shown that Pd, Rh, iridium (Ir) and Ru catalysts have poor performance of NO oxidation and in particular that Pd supported on $Al_2O_3$ has a NO oxidation ratio of 0%.

On the other hand, as purification method of nitrogen oxides, a purification method for an exhaust gas in which a part of NO is oxidized to $NO_2$ with a Pt catalyst and then the exhaust gas is introduced to on a reduction catalyst together with ammonia, noticing that most reduction catalyst has higher activity for nitrogen dioxide than for nitrogen monoxide, is proposed in US-A-2002-039550 (JP-A-2002-1067).

BRIEF SUMMARY OF THE INVENTION

It is necessary for the reactions of the above formulae (1) to (4) to proceed efficiently in order to remove nitrogen oxides efficiently. When the temperature of an exhaust gas is high as in the case of running at high speed, the reaction of formula (2) proceeds easily, which result in efficient removal of nitrogen oxides. On the other hand, when the temperature of an exhaust gas is low as in the case of running in urban area, as described above, it is desirable to promote the reaction of formula (3) by promoting the reaction of formula (5) in order to form $NO_2$. In addition, when the temperature of exhaust gases is low, the reaction of formula (2) hardly proceeds as mostly the reaction of formula (3) proceeds, which makes it an important subject to form $NO_2$. However, the reaction of formula (5) is so slow under a low temperature condition even when the Pt catalyst disclosed in the above U.S. Pat. No. 4,902,487 or US-A-2002-039550 is used that sufficient effect for purifying nitrogen oxides and particulate matters has not been obtained. In addition, when the temperature of exhaust gases is low, it has been necessary in a conventional method to elevate the temperature of the exhaust gas, which sometimes has made a system complicated.

In addition, since the reaction for $NO_2$ purification represented by formula (4) proceeds even at relatively low temperature, a greater demand for an oxidation catalyst for converting NO to $NO_2$ when an exhaust gas is at low temperature has risen.

Further, installation of an apparatus for separately forming $NO_2$ as described in US-A-2004-168429 requires a plasma-generating device and its peripheral devices to be installed, which poses a problem of high equipment cost and power cost and makes it unsuitable to be used for vehicles due to a sufficient installation space to be required.

Therefore an object of the present invention is to provide an oxidation catalyst for efficiently promoting oxidation of NO to $NO_2$ even in a low temperature range.

Another object of the present invention is to provide an exhaust-gas purification system and method for efficiently removing nitrogen oxides or particulate matters even in a low temperature range.

The present inventors have found, after having intensively studied a way to solve the above problem, that an oxidation catalyst containing platinum and palladium as catalytically active components which contains 1 to 55 parts by weight of the palladium relative to 100 parts by weight of the platinum, efficiently promotes oxidation of NO to $NO_2$ even in a low temperature range, and completed the present invention.

In other words, the present invention provides an oxidation catalyst comprising platinum and palladium as catalytically active components, which promotes oxidation of nitrogen monoxide to nitrogen dioxide, wherein the oxidation catalyst comprises 1 to 55 parts by weight of the palladium relative to 100 parts by weight of the platinum.

In addition, the present invention provides an exhaust-gas purification system, which comprises an oxidation catalyst containing platinum and palladium as catalytically active components and promoting oxidation of nitrogen monoxide to nitrogen dioxide which contains 1 to 55 parts by weight of the palladium relative to 100 parts by weight of the platinum, in the exhaust-gas passage of an internal-combustion engine.

Further, the present invention provides an exhaust-gas purification method for purifying the exhaust gas discharged from an internal-combustion engine, having (1) a step for converting nitrogen monoxide in the exhaust gas to nitrogen dioxide by bringing the exhaust gas into contact with an oxidation catalyst containing platinum and palladium as catalytically active components which contains 1 to 55 parts by weight of the palladium relative to 100 parts by weight of the platinum, and (2) a step for reducing the nitrogen oxides in the exhaust gas by bringing the exhaust gas obtained in the step (1) into contact with a $NO_x$ reduction catalyst in the presence of a reducing agent.

Still further, the present invention provides an exhaust-gas purification method for purifying the exhaust gas discharged from an internal-combustion engine, having (1) a step for converting nitrogen monoxide in the exhaust gas to nitrogen dioxide by bringing the exhaust gas into contact with an oxidation catalyst containing platinum and palladium as catalytically active components which contains 1 to 55 parts by weight of the above palladium relative to 100 parts by weight of the platinum, (2) a step for reducing the nitrogen oxides in the exhaust gas by bringing the exhaust gas obtained in the step (1) into contact with a $NO_x$ reduction catalyst in the presence of a reducing agent, and (3) a step for removing at least a part of particulate matters.

Since the oxidation catalyst of the present invention can form $NO_2$ even when an exhaust gas is at low temperature, it can efficiently promote a reaction of a substance to be reacted with $NO_2$ even when an exhaust gas is at low temperature.

The above and other objects, features and advantages of the present invention will become clear from the following description of the preferred embodiments.

DETAILED DESCRIPTION OF THE INVENTION

Figure 1:
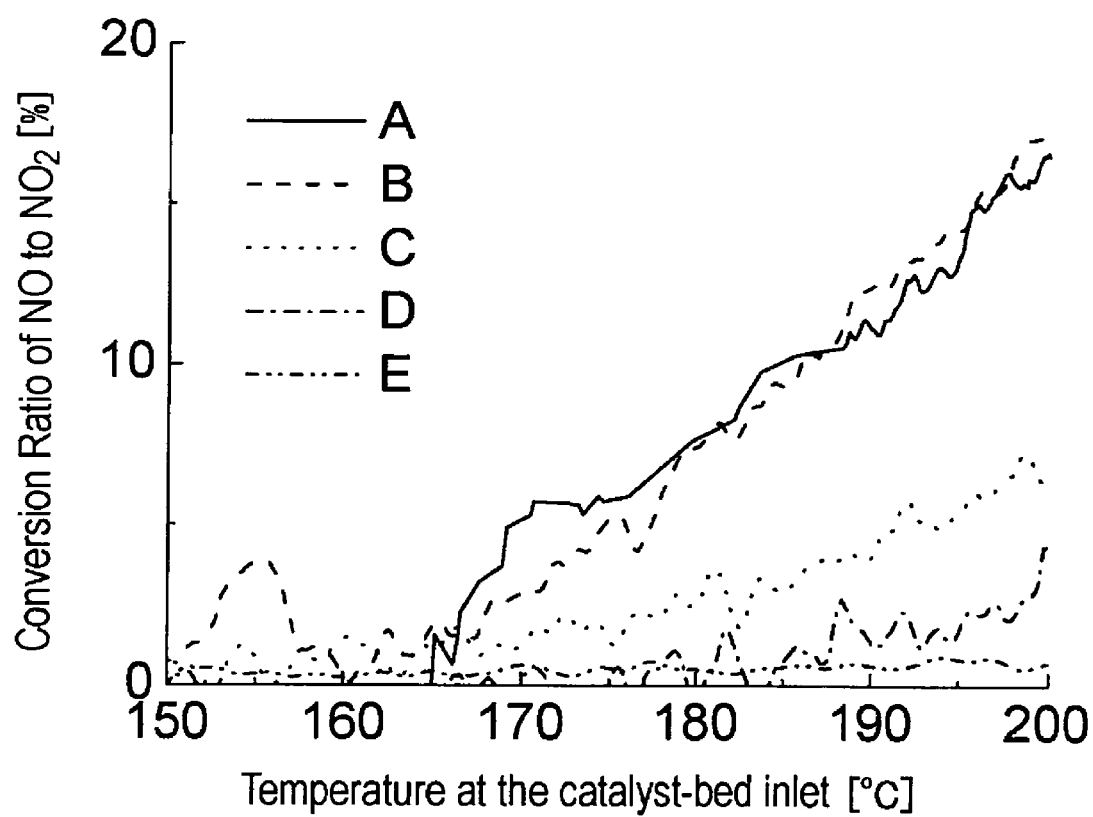
FIG. 1 is a drawing showing the result of Evaluation Example 1.

The first aspect of the present invention is an oxidation catalyst containing platinum and palladium as catalytically active components and promoting oxidation of nitrogen monoxide to nitrogen dioxide, which is characterized by containing 1 to 55 parts by weight of the above palladium relative to 100 parts by weight of the above platinum.

As described above, Pt, Pd, Ru, Rh and the like are disclosed as a catalytically active component for promoting oxidation of NO to $NO_2$, for example, in US-A-4902487. However, only an effect of a catalyst containing Pt alone as an active component is shown specifically in U.S. Pat. No. 4,902,487. Pt has been usually used as an active component for forming $NO_2$, because Pd used alone as a catalytically active component has much poorer oxidation activity compared with Pt used alone as described in "Barry J. Cooper, et al., Role of NO in Diesel Particulate Emission Control, SAE paper, 890404". The present invention has found that a catalyst made of a combination of Pt and Pd has a synergistic effect on promotion of nitrogen dioxide formation and also has found the range where an oxidation catalyst functions effectively by specifying contents of the Pt and Pd even under a low temperature condition. In addition, the oxidation catalyst has an adequate activity after the oxidation catalyst is used for a long period.

The ratio of the contents of Pt and Pd by weight is 1 to 55 parts by weight of Pd relative to 100 parts by weight of Pt. Further, it is preferably that the ratio of the contents of Pt and Pd by weight is 1 to 45 parts by weight, 1 to 35 parts by weight, 1 to 20 parts by weight, 4 to 20 parts by weight, 4 to 12 parts by weight, 5 to 12 parts by weight of Pd relative to 100 parts by weight of Pt, in this order. An oxidation catalyst containing these ranges of Pt and Pd promotes conversion of NO to $NO_2$ very efficiently even in a low temperature range.

The amount (sum) of Pt and Pd to be used is preferably 0.1 to 20 g, more preferably 0.5 to 10 g per liter of a three-dimensional structure. This range of the amount gives excellent catalyst activity in initial and endurance operation.

The oxidation catalyst of the present invention may contain other metals and oxides thereof as catalytically active components as long as the catalyst contains Pt and Pd at the above specified ratio. The metal includes specifically a metal such as ruthenium, rhodium, iridium, gold, cobalt, nickel and copper, and an alloy thereof, and the like. The content of other metals and oxides thereof is usually 0 to 2000% by weight relative to 100% by weight of catalytically active components.

Preferably, the oxidation catalyst of the present invention has a structure where a catalytically active component is supported on a refractory inorganic oxide to form a catalytically active component-supporting inorganic oxide which is further supported on a three-dimensional structure.

The catalytically active component which is supported on a refractory inorganic oxide is not particularly limited, and preferably is present in the state of catalyst metal particles having a mean particle diameter of preferably 1 to 50 nm.

The refractory inorganic oxide to be used in the present invention is not particularly limited as long as it is usually used as a catalyst carrier, and includes activated alumina such as α-, γ-, δ-, η- and θ-alumina; zirconia, titania, zeolite, silica; or a composite oxide of these oxides such as alumina-silica, alumina-titania, alumina-zirconia and titania-zirconia. From the standpoint of improving catalyst performance, activated alumina, alumina-silica, zirconia, titania and zeolite are preferable and activated alumina is more preferable. The above inorganic oxide may be used alone or in combination of two or more. Preferably, the shape of the refractory inorganic oxide is a powder.

The amount of the refractory inorganic oxide (excluding active components) to be used is preferably 10 to 300 g, more preferably 20 to 150 g per liter of a three-dimensional structure. This range of the amount gives sufficient dispersion of a noble metal and satisfactory durability.

The BET specific surface area of the refractory inorganic oxide is preferably 50 to 750 m$^2$/g, more preferably 150 to 750 m$^2$/g. The mean primary particle diameter of the refractory inorganic oxide powder is 0.5 to 150 μm, preferably 1 to 100 μm.

The three-dimensional structure to be used in the present invention includes a heat-resistant carrier such as a honeycomb carrier, and particularly, a honeycomb structure of an integrally molded type is preferable, for example, a monolithic honeycomb carrier, a metal honeycomb carrier, a plug honeycomb carrier and a pellet carrier are included.

The monolithic carrier includes a carrier that is usually called a ceramic honeycomb carrier, and particularly, a honeycomb carrier made of material such as cordierite, mullite, α-alumina, zirconia, titania, titanium phosphate, aluminum titanate, betallite, spondumene, aluminosilicate, magnesium silicate is preferable, and cordierite-base is particularly preferable among these. In addition, a three-dimensional structure made of a heat-resistant metal of oxidation resistance such as stainless steel and a Fe—Cr—Al alloy is used.

These monolithic carriers are manufactured by an extrusion molding method, a method of rolling up a sheet-shaped element, and the like. The shape of a gas passage (cell shape) may be any of a hexagon, a quadrangle, a triangle and a corrugated shape. The carrier having a cell density (number of cell/cross-sectional area) of 100 to 600 cells/square inch can be satisfactorily used, and preferably 200 to 500 cells/square inch.

The oxidation catalyst of the present invention may contain an alkaline metal such as potassium, an alkaline-earth metal such as magnesium and barium, a rare-earth metal such as lanthanum and cerium, and an metal oxide thereof, or zeolite, and the content thereof is usually 0 to 100 g per liter of a three-dimensional structure.

The production method for the oxidation catalyst of the present invention is not particularly limited, and will be described below with specific examples.

Firstly, as starting raw materials of Pt and Pd, inorganic salts such as a chloride (halide), a nitrate, a sulfate, an ammonium salt, an amine, a carbonate, a bicarbonate, a nitrite and an oxalate of Pt and Pd; a carboxylate such as a formate, a hydroxide, an alkoxide, and an oxide of Pt and Pd; preferably a chloride, a nitrate, an ammonium salt, an amine and a carbonate are prepared. Specifically, in the case that the active component is Pt, dinitrodiamine platinate nitrate, chloroplatinic acid (hexachloroplatinic acid), platinum nitrate and the like are included, and in the case that the active component is Pd, palladium nitrate, palladium chloride are included. The above raw material and a refractory inorganic oxide powder are subjected to wet milling to prepare an aqueous slurry. A three-dimensional structure is coated with the slurry, dried usually at 50 to 150° C. for 30 minutes to 8 hours and then calcined at usually 300 to 800° C., preferably 400 to 600° C. for 15 minutes to 2 hours, preferably 30 minutes to an hour to obtain the oxidation catalyst of the present invention. Thus obtained oxidation catalyst having a metal-particle diameter of a catalytically active component of 1 to 50 nm gives excellent oxidation performance. The oxidation performance of the oxidation catalyst having a metal-particle diameter smaller than 1 nm is undesirably impaired due to interaction with a carrier, whereas the oxidation catalyst having a metal-particle diameter larger than 50 nm has undesirably less metal surface area resulting in less numbers of metal atoms to be used for catalytic reaction.

The second aspect of the present invention is an exhaust-gas purification system wherein the oxidation catalyst of the first aspect of the present invention is installed in the exhaust-gas passage of an internal-combustion engine. Since the oxidation catalyst of the first aspect of the present invention efficiently converts NO to NO$_2$ even in a low temperature range as described above, the exhaust-gas purification system of the second aspect of the present invention can efficiently remove nitrogen oxides even under a low temperature condition.

The embodiments of the present invention will be described hereinafter with reference to the drawings. The technical scope of the present invention should be defined by the scope of claims and is not limited to the following embodiments.

Figure 2:
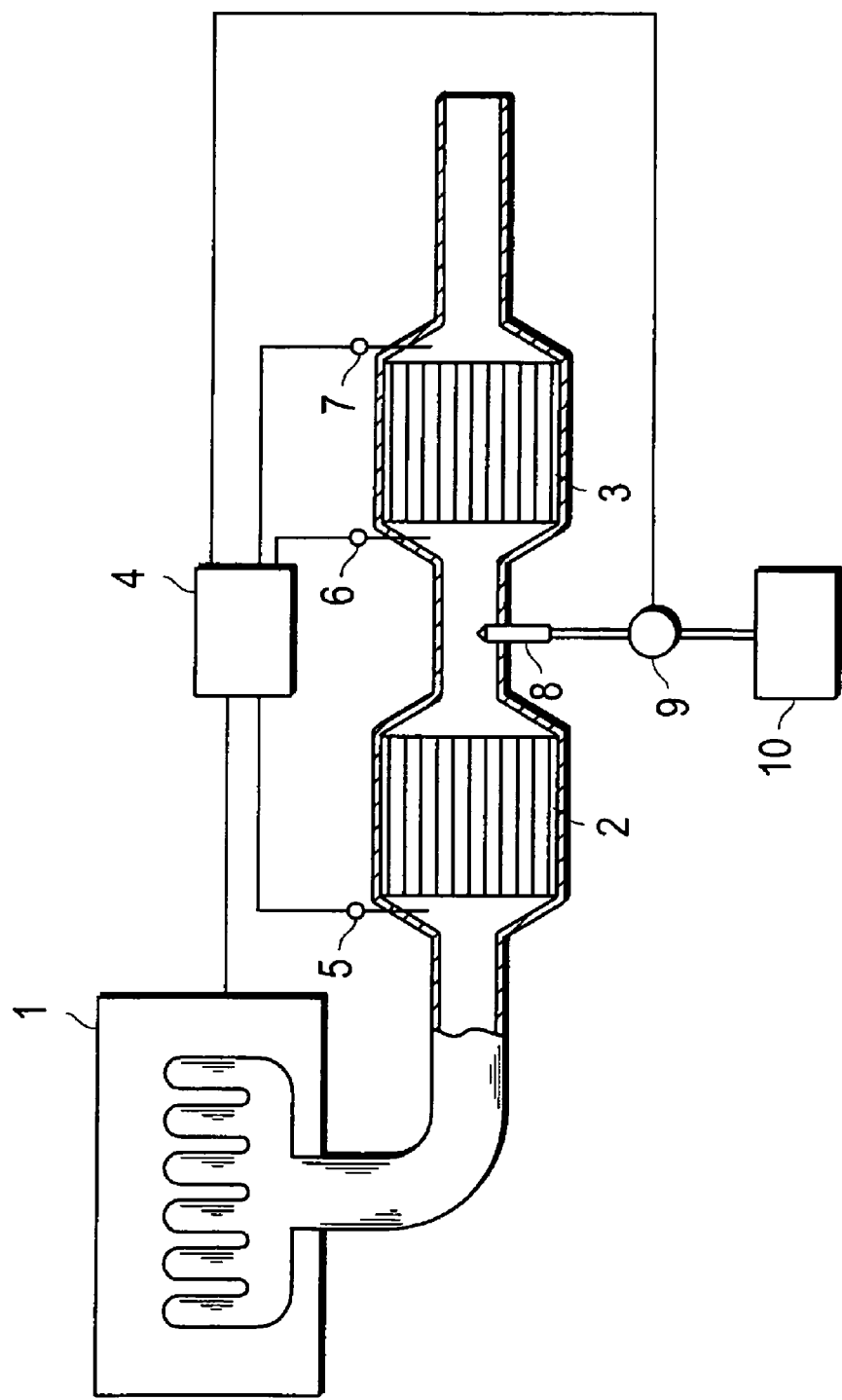
FIG. 2 is a schematic drawing showing an example of the exhaust-gas purification system of the present invention.

FIG. 2 is a schematic drawing showing an embodiment of the exhaust-gas purification system of the second aspect of the present invention. The exhaust-gas purification system shown in FIG. 2 is equipped with an oxidation catalyst installed in the exhaust-gas passage of an internal-combustion engine, a apparatus (reducing agent injection nozzle 8, pump 9, reducing agent tank 10) supplying a reducing agent to latter stage of the oxidation catalyst, and a NO$_x$ reduction catalyst 3 in the exhaust-gas passage at latter stage of the reducing agent supplying apparatus. The internal-combustion engine 1 and the pump 9 are controlled by a controller 4. A temperature controller is composed of the controller 4 and thermocouples 5 to 7.

The exhaust gas discharged from the internal-combustion engine 1 is introduced through the exhaust-gas passage to the oxidation catalyst 2 installed in the exhaust-gas passage. The exhaust gas contains NO and NO$_2$ as nitrogen oxides, most of which is NO under a low temperature condition. By contacting with the oxidation catalyst 2, the conversion reaction of NO in the exhaust gas to NO$_2$ proceeds.

The reducing agent stored in the reducing agent tank 10 is then supplied from the reducing agent injection nozzle 8 to the exhaust-gas passage with actuation of the pump 9.

Figure 3:
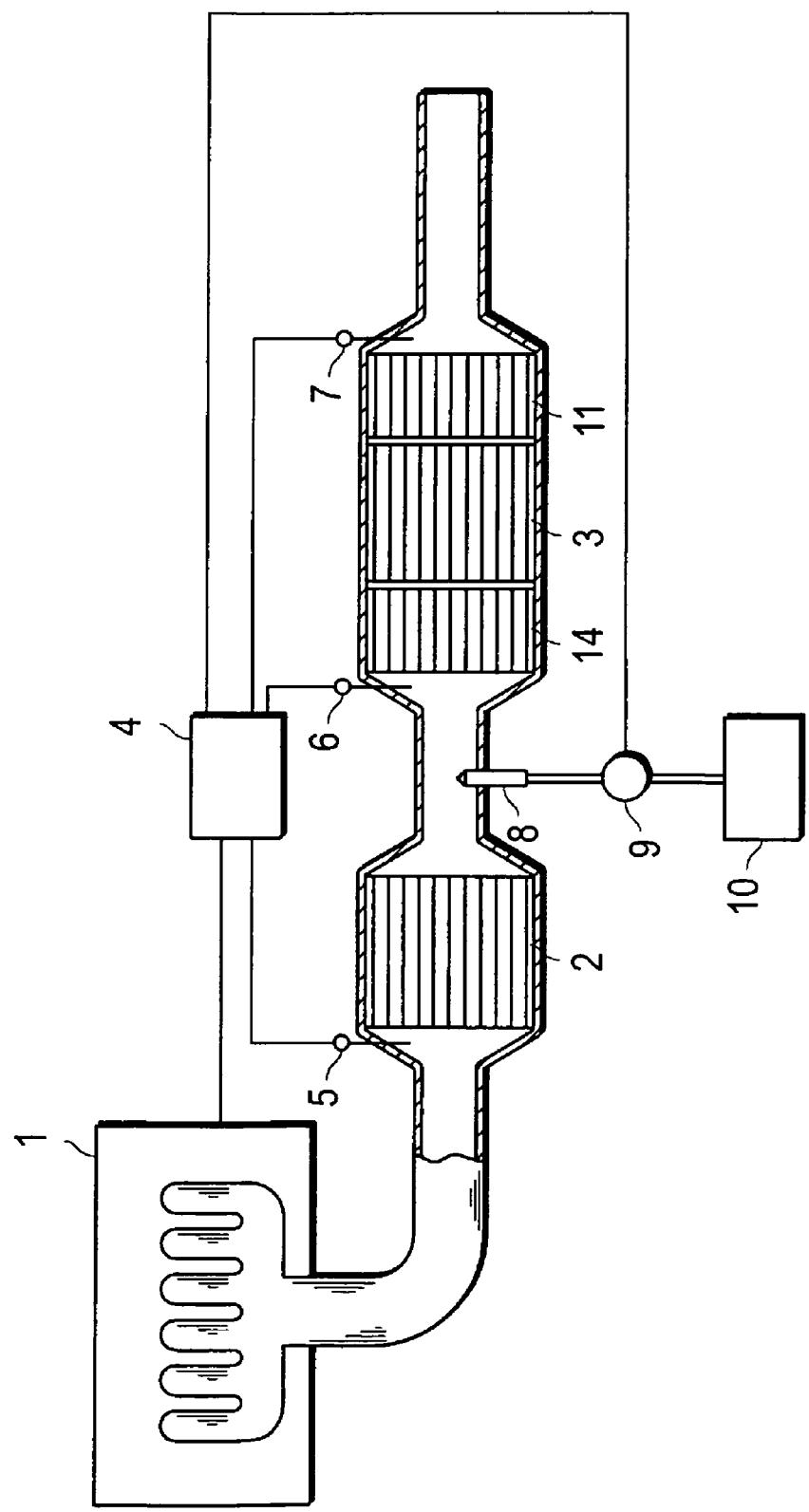
FIG. 3 is a schematic drawing showing an example of the exhaust-gas purification system of the present invention.

Ammonia, urea, a hydrocarbon such as light oil, an alcohol of 1 to 3 carbon atoms and an ether of 2 to 6 carbon atoms can be used as the reducing agent, but from the standpoint of handling, preferably at least one selected from urea, light oil, dimethyl ether, methane, ethane, propane, hexane, ethylene, propylene, hexene, gasoline, kerosene, fuel oil A (JIS), fuel oil C (JIS), methanol, ethanol and propanol, more preferably at least one kind selected from urea, ammonia, light oil, dimethyl ether, methanol, ethanol and propanol, still more preferably urea, light oil, dimethyl ether and ethanol, and particularly preferably urea and light oil are used. It is preferable in the case of use of urea that a catalyst for hydrolyzing urea 14 is installed downstream as shown in FIG. 3 or the NO$_x$ reduction catalyst to be described later has a function for hydrolyzing urea. In addition, it is preferable that urea water is injected from the injection nozzle 8 as shown in FIG. 3.

Subsequently, remaining NO and NO$_2$ are converted to N$_2$ on the NO$_x$ reduction catalyst 3 installed in the exhaust-gas passage. The nitrogen oxides in the exhaust gas are efficiently removed even under a low temperature condition by the system comprising the above plural stages. It should be noted that a catalyst of suppressing slip of a reducing agent 11 is installed at the latter stage of the NO$_x$ reduction catalyst in FIG. 3.

In addition, the temperature controller composed of the controller 4 and the thermocouples 5 to 7 shown in FIG. 2 can control the temperature of the exhaust gas at each stage. The temperature of the exhaust gas may be controlled to be preferably 140° C. or higher, more preferably 160° C. or higher before the exhaust gas is introduced to the oxidation catalyst 2.

In addition, in the case that the reducing agent is urea, the temperature of the exhaust gas is controlled to be preferably 135° C. or higher, more preferably 160° C. or higher before the exhaust gas is introduced to the reduction catalyst 3. In such a temperature range, preferably, thermal decomposition of urea represented by the following formula (6) or hydrolysis of isocyanic acid, which is generated by the thermal decomposition of urea, represented by the following formula (7) proceeds easily.

$$(NH_2)_2CO \rightarrow NH_3 + HNCO \quad (6)$$

$$HNCO + H_2O \rightarrow NH_3 + CO_2 \quad (7)$$

In the case that the reducing agent is a hydrocarbon, the temperature of the exhaust gas before the exhaust gas is introduced to the $NO_x$ reduction catalyst 3 is preferably the boiling point of the hydrocarbon or higher. In the case that the reducing agent is light oil, the temperature of the exhaust gas is controlled to be preferably 200° C. or higher, more preferably 250 to 550° C. In such a temperature range, preferably, the liquid hydrocarbon hardly sticks to the surface of the reduction catalyst leading to efficient removal of $NO_x$.

The $NO_x$ reduction catalyst is not particularly limited as long as it is usually known, and may be selected as appropriate according to the vehicle weight, the engine displacement and the like, to be mounted. In the case that the reducing agent is urea, a zeolite catalyst exchanged by a specific transition metal is preferably used. In addition, in the case that the reducing agent is a hydrocarbon such as light oil, an alcohol of 1 to 3 carbon atoms and an ether of 2 to 6 carbon atoms, a noble metal such as Pt, Pd and Rh supported on an inorganic carrier such as alumina, silica and alumina-silica is preferably used in a low temperature range of 300° C. or lower, whereas a zeolite catalyst exchanged by a specific transition metal is preferably used in a high temperature range of 300° C. or higher.

The zeolite catalyst exchanged by a transition metal is preferably supported on a three-dimensional structure. As the three-dimensional structure, the structure described in column of the above oxidation catalyst can be used.

The transition metal is not limited, and includes copper, iron, cerium, vanadium, chromium, nickel and oxides thereof, preferably copper, iron, vanadium and oxides thereof.

The amount of the transition metal to be used is preferably 1 to 80 g, more preferably 2 to 40 g per liter of a three-dimensional structure. This range of the amount gives excellent catalyst activity in initial and endurance operation. It should be noted, the zeolite catalyst exchanged by a transition metal includes not only the zeolite having the form where a transition metal is ion exchanged, but also the zeolite having both of the form where a transition metal is ion exchanged and the form where a transition metal is coated. The above amount of the transition metal to be used indicates the sum of the ion-exchanged transition metal and the transition metal coated on the zeolite.

The zeolite to be used is not particularly limited, and includes BEA type, MFI type, FER type, FAU type and MOR type zeolite, preferably BEA type and MFI type zeolite.

The amount of zeolite to be used (excluding active components) is preferably 10 to 300 g, preferably 50 to 300 g per liter of a three-dimensional structure. This range of the amount gives sufficient dispersion of a transition metal and satisfactory durability. In addition, the BET specific surface area of zeolite is preferably 50 to 750 m²/g, more preferably 150 to 750 m²/g. In addition, the mean primary particle diameter of zeolite is preferably 0.5 to 150 μm, more preferably 1 to 100 μm.

The $NO_x$ reduction catalyst to be used in the present invention may contain an alkaline metal such as potassium, an alkaline-earth metal such as magnesium and barium, a rare-earth element such as lanthanum and cerium, and oxides thereof or zeolite.

The production method for the $NO_x$ reduction catalyst that can be used in the present invention is not particularly limited. As one example, a production method for a zeolite catalyst exchanged by a specific transition metal will be specifically described below.

Firstly, a transition metal salt such as iron nitrate, iron acetate and iron sulfate is prepared as a raw material of a transition metal. The above raw material and zeolite are then subjected to wet milling to prepare an aqueous slurry. A three-dimensional structure is coated with this slurry, dried usually at 50 to 150° C. for 30 minutes to 8 hours and then calcined at 300 to 800° C., preferably 400 to 600° C. for 15 minutes to 2 hours, preferably 30 minutes to 1 hour to obtain a $NO_x$ reduction catalyst.

In addition, the purification system of the present invention includes various improved embodiments that use the oxidation catalyst of the first aspect of the present invention, preferably have a supplying apparatus of a reducing agent at the latter stage of the oxidation catalyst and further have a $NO_x$ reduction catalyst at the latter stage of the supplying apparatus of a reducing agent. For example, an embodiment having a catalyst of suppressing slip of a reducing agent 11 at the latter stage of the $NO_x$ reduction catalyst 3 (FIG. 4), an embodiment having a diesel particulate filter 13 at the latter stage of the $NO_x$ reduction catalyst 3 (FIG. 8), an embodiment including a diesel particulate filter 13 at the latter stage of the oxidation catalyst 2 (FIG. 5), an embodiment including a catalyst for hydrolyzing urea 14 (FIG. 3) and a combination (FIG. 6 and FIG. 7) of these embodiments are included. Thermocouple 12 is installed after the $NO_x$ reduction catalyst 3 in the embodiment of FIG. 5 or FIG. 6.

Figure 4:
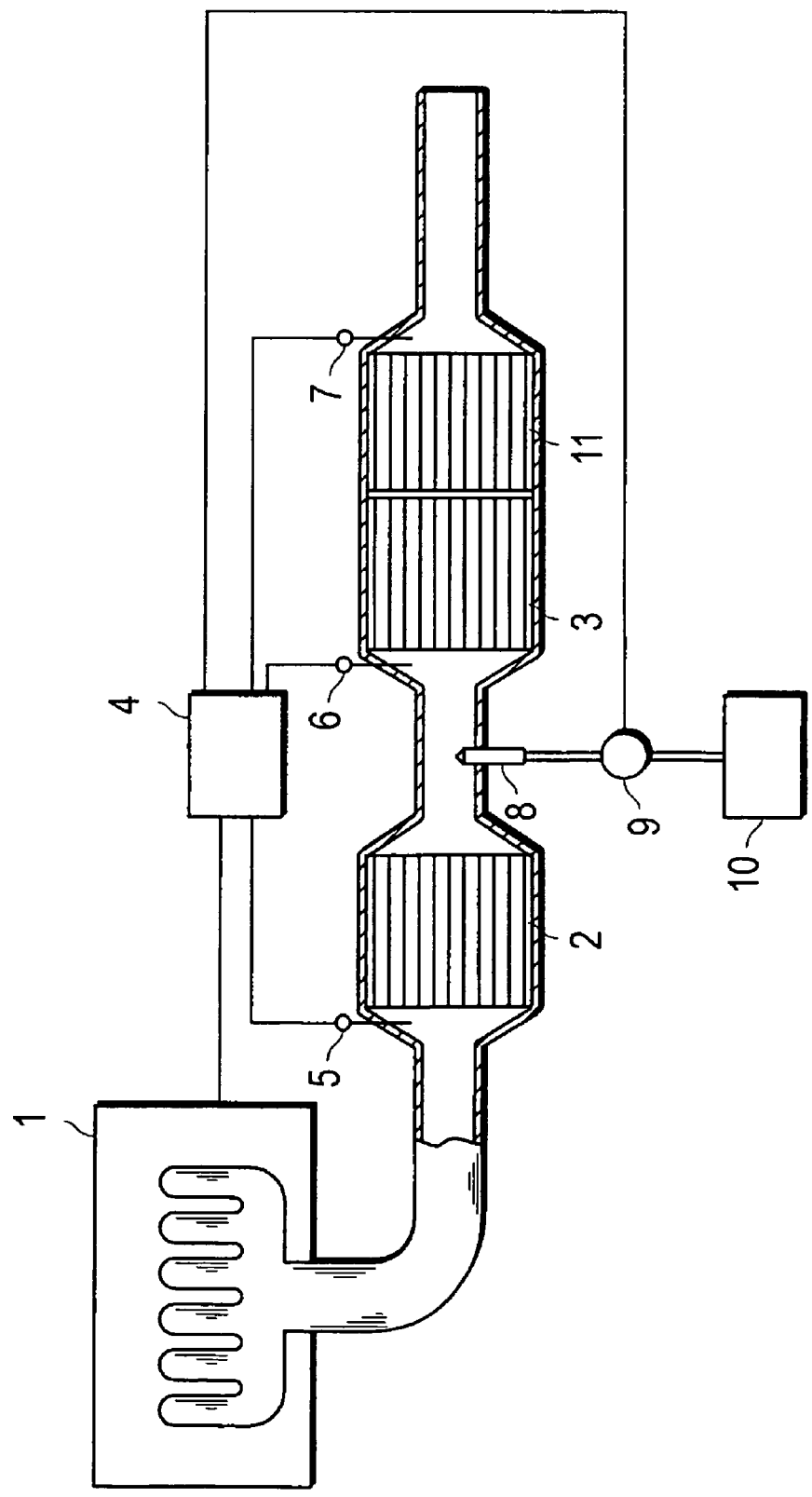
FIG. 4 is a schematic drawing showing an example of the exhaust-gas purification system of the present invention.

In the case that the reducing agent is urea or ammonia, an embodiment having a catalyst of suppressing slip of a reducing agent 11 installed as shown in FIG. 4 is preferable. It should be noted that, the catalyst of suppressing slip of a reducing agent indicates a catalyst for preventing discharge of extra ammonia, for which a conventionally known oxidizing catalyst can be used.

Figure 5:
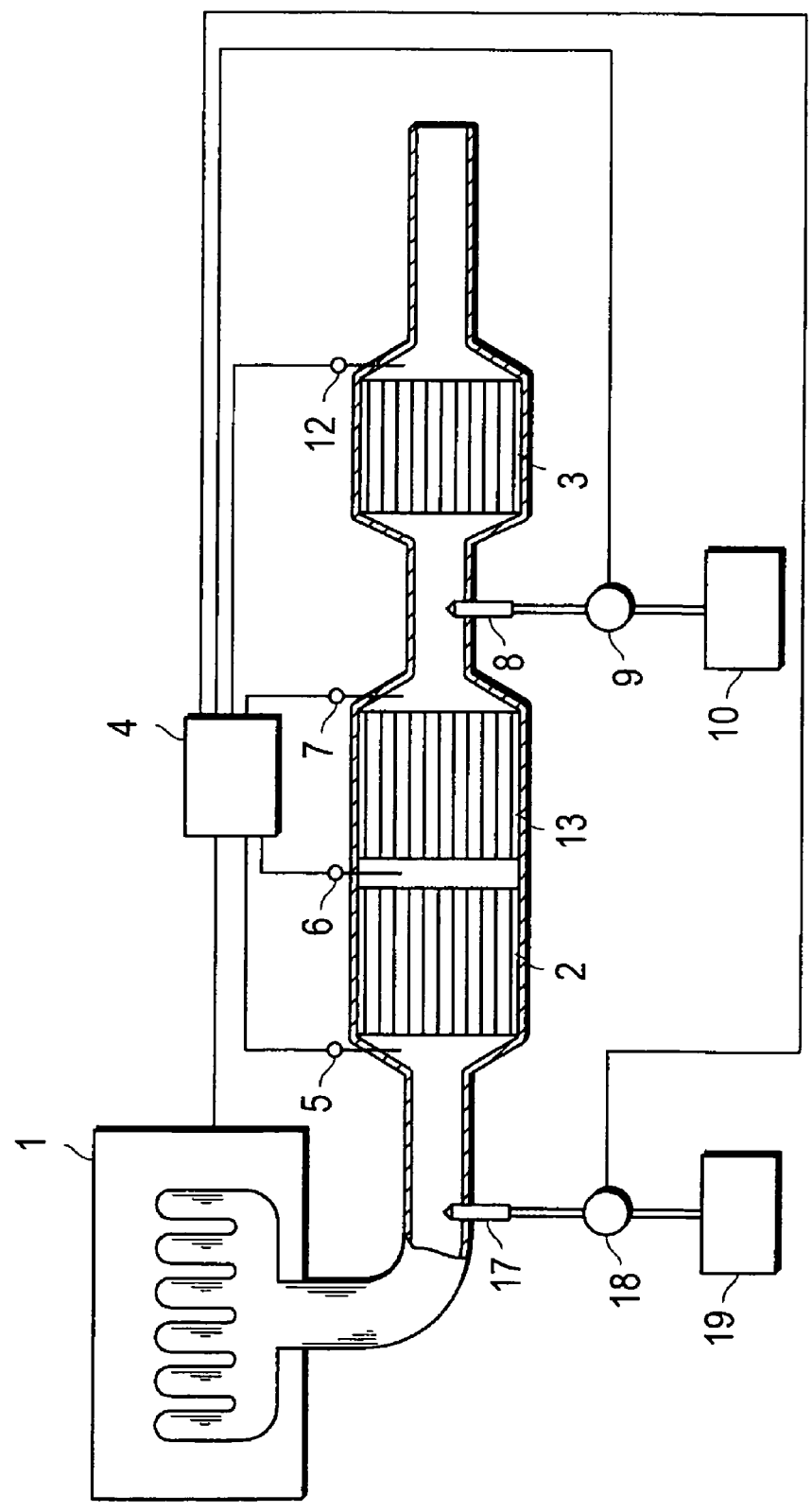
FIG. 5 is a schematic drawing showing an example of the exhaust-gas purification system of the present invention.
Figure 6:
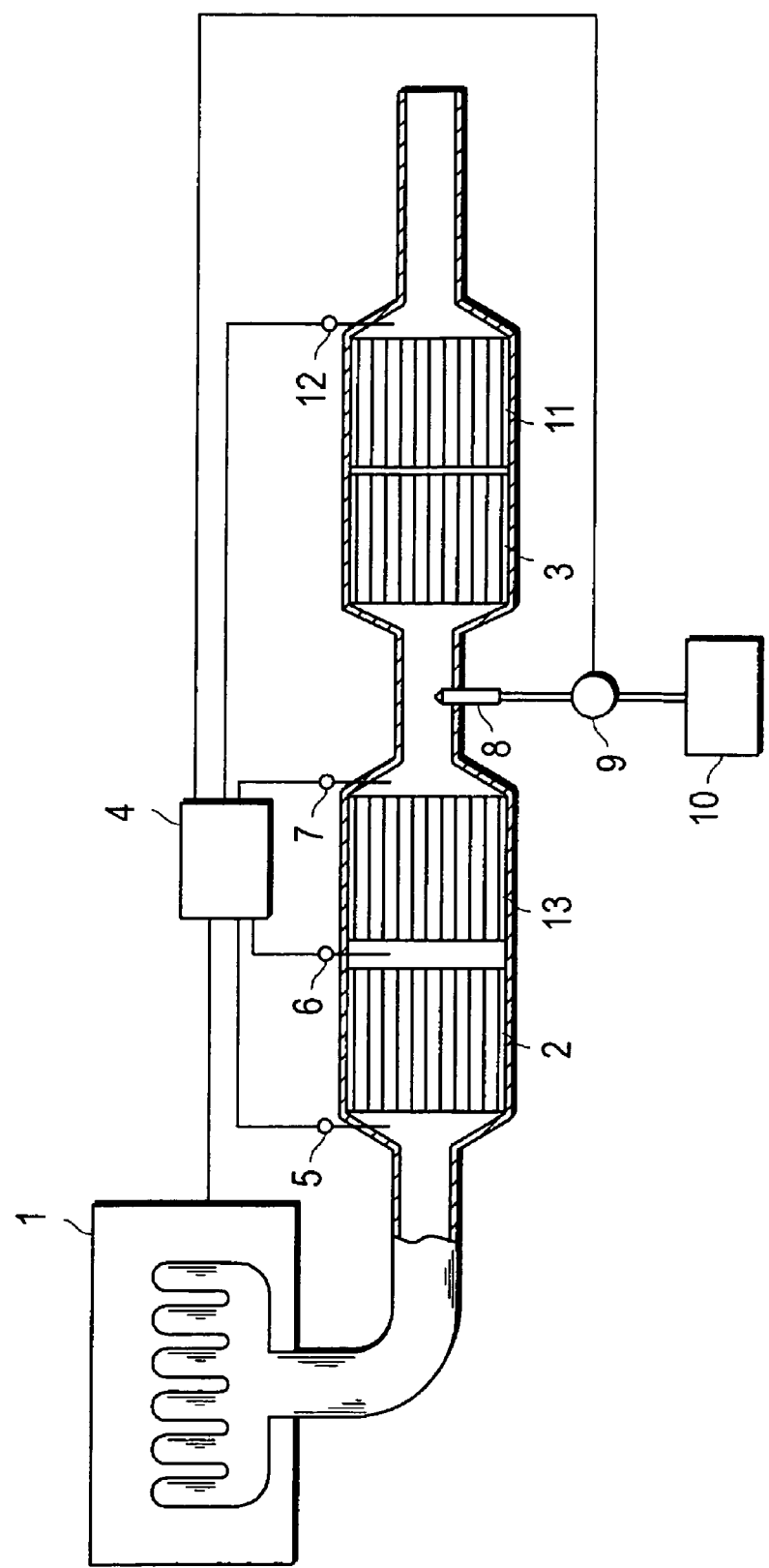
FIG. 6 is a schematic drawing showing an example of the exhaust-gas purification system of the present invention.
Figure 7:
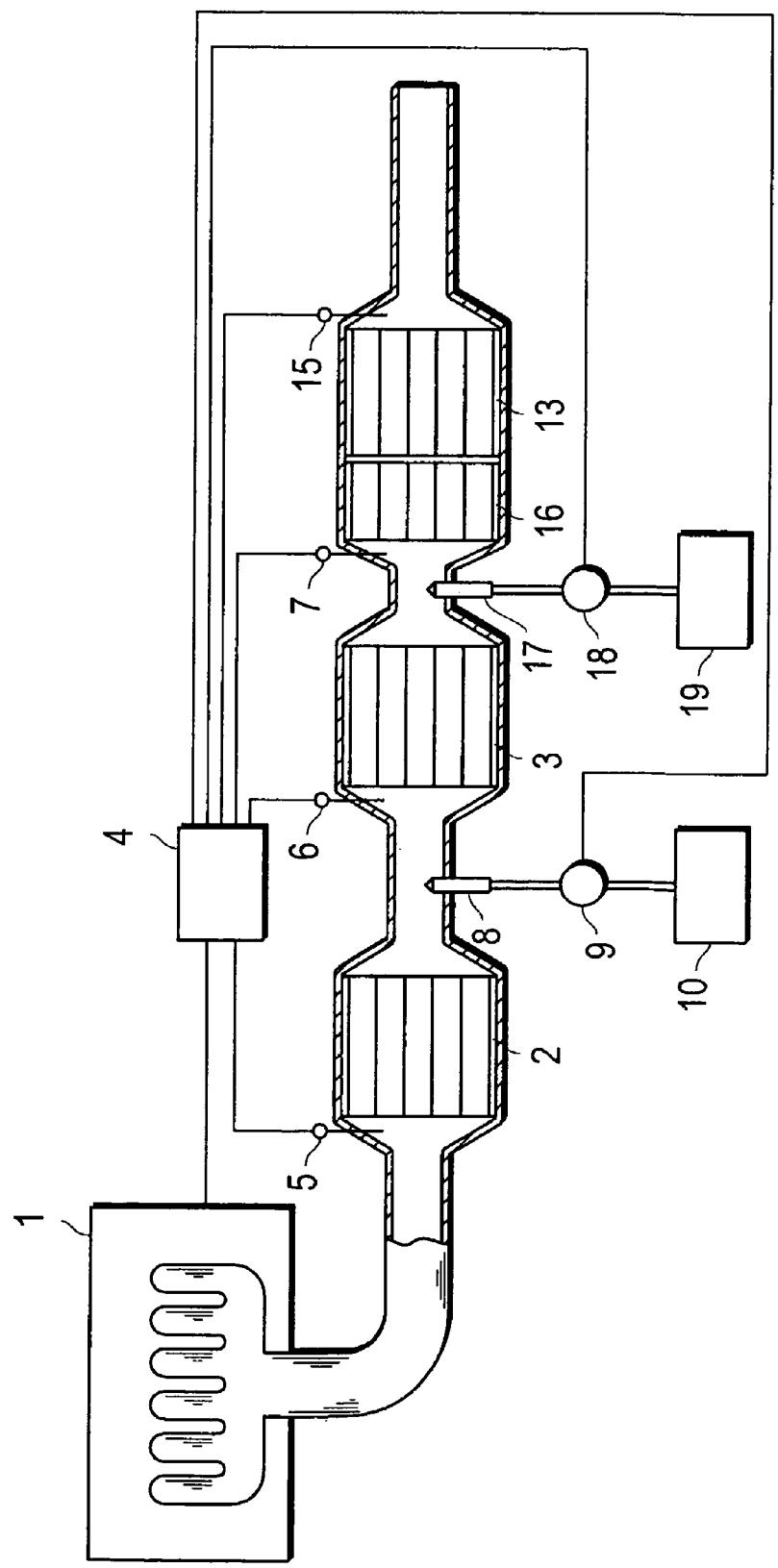
FIG. 7 is a schematic drawing showing an example of the exhaust-gas purification system of the present invention.
Figure 8:
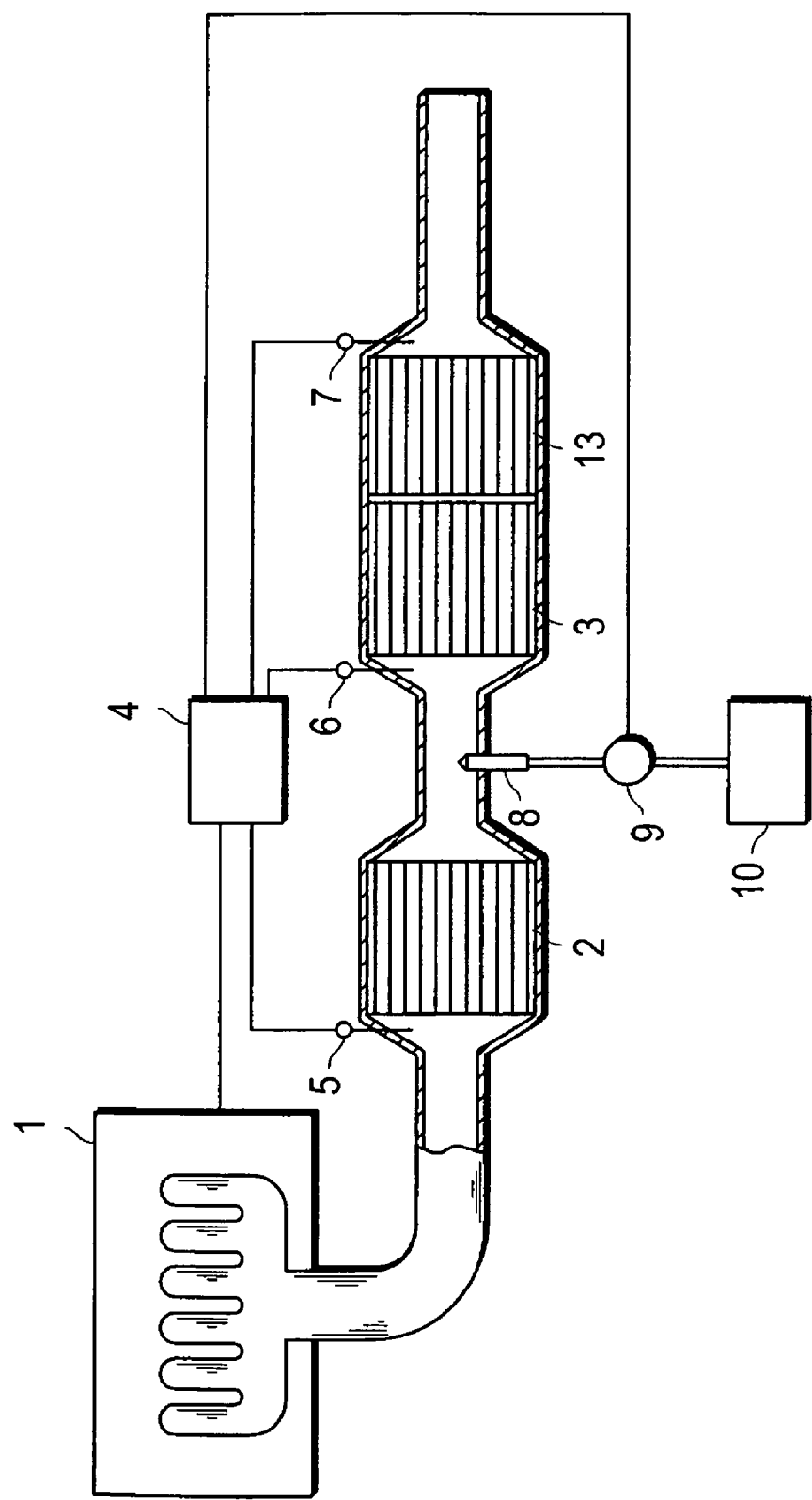
FIG. 8 is a schematic drawing showing an example of the exhaust-gas purification system of the present invention.

In addition, a diesel particulate filter can remove at least a part of particulate matters. In an embodiment including a diesel particulate filter, a fuel supplying apparatus composed of a fuel injection nozzle 17, a pump 18 and a fuel tank 19 may be installed before the diesel particulate filter 13 as shown in FIG. 5 or FIG. 7. In such an embodiment, the filter requires processing for regeneration when particulates are accumulated. The system of FIG. 7 is described as follows: Fuel is supplied from the fuel supplying apparatus to the oxidation catalyst 16 through the exhaust-gas passage and the temperature of the exhaust gas is controlled to be high enough to burn the particulates. Thermocouple 15 is installed after the diesel particulate filter 13 in the embodiment of FIG. 7. The fuel necessary for regeneration of the diesel particulate filter may be supplied either to the exhaust-gas passage as shown above or before an exhaust-gas discharge step after fuel combustion in an engine cylinder. In addition, when a diesel particulate filter is used, preferably, the temperature of the exhaust gas to be introduced to the diesel particulate filter is not too low, specifically 200° C. or higher in view of regeneration of the diesel particulate filter. Various kinds of diesel particulate filters are available and a known filter such as a filter made of cordierite and a filter made of heat-resistant silicon carbide can be used. In addition, the diesel particulate filter may contain a catalyst component. The catalyst component is not limited and includes one that at least one kind of catalytically active component such as platinum, palladium, rhodium, iridium, gold, silver, iron, copper and manganese is supported on a refractory inorganic oxide. The refractory inorganic oxide includes activated alumina; zirconia, titania, zeolite, silica, ceria, magnesia, silica-alumina, ceria-zirconia, and the mixture thereof. The amount of the catalytically active component is preferably 0.1-10 g per liter of the catalyst, and the amount of the refractory inorganic oxide is preferably 5-100 g per liter of the catalyst.

A catalyst of suppressing slip of a reducing agent and a catalyst for hydrolyzing urea that are conventionally known can be used.

The third aspect of the present invention is an exhaust-gas purification method for purifying an exhaust gas discharged from an internal-combustion engine. The exhaust-gas purification method is characterized by comprising (1) a step for converting nitrogen monoxide in the exhaust gas to nitrogen dioxide by bringing the exhaust gas into contact with the oxidation catalyst of the first aspect of the present invention and (2) a step for reducing the nitrogen oxides in the exhaust gas by bringing the exhaust gas obtained in the step (1) into contact with a $NO_x$ reduction catalyst in the presence of a reducing agent. Preferably, the method comprises further (3) a step for purifying at least a part of particulate matters. The details of each step are as described above.

The oxidation catalyst of the present invention and the purification system using it can purify nitrogen oxides discharged from various internal-combustion engines such as a diesel engine, a gasoline engine and a compressed-natural-gas engine, and are preferably applied to a diesel engine among the above engines or to a vehicle driven by a diesel engine.

EXAMPLES

The embodiments of the present invention will be described hereinafter in more detail using the examples and comparative examples. The technical scope of the present invention is not limited to the following embodiments.

Example 1

20.4 g of an aqueous solution of dinitrodiamine platinum corresponding to 2.32 g of platinum, 1.1 g of an aqueous solution of palladium nitrate corresponding to 0.15 g of palladium and 80 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (A). A cylindrical honeycomb carrier made of cordierite of 24 mm in diameter and 50 mm in length having 400 cells per square inch of cross-sectional area was coated (wash coat) with this slurry, dried at 120° C. for 8 hours and then calcined at 500° C. for an hour to obtain catalyst A so that the sum of platinum, palladium and alumina is 82.47 g per liter of the honeycomb carrier.

Example 2

19.8 g of an aqueous solution of dinitrodiamine platinum corresponding to 2.25 g of platinum, 1.57 g of an aqueous solution of palladium nitrate corresponding to 0.22 g of palladium and 80 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (B). A cylindrical honeycomb carrier made of cordierite of 24 mm in diameter and 50 mm in length having 400 cells per square inch of cross-sectional area was coated (wash coat) with this slurry, dried at 120° C. for 8 hours and then calcined at 500° C. for an hour to obtain catalyst B so that the sum of platinum, palladium and alumina is 82.47 g per liter of the honeycomb carrier.

Example 3

14.4 g of an aqueous solution of dinitrodiamine platinum corresponding to 1.64 g of platinum, 5.92 g of an aqueous solution of palladium nitrate corresponding to 0.83 g of palladium and 80 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (C). A cylindrical honeycomb carrier made of cordierite of 24 mm in diameter and 50 mm in length having 400 cells per square inch of cross-sectional area was coated (wash coat) with this slurry, dried at 120° C. for 8 hours and then calcined at 500° C. for an hour to obtain catalyst C so that the sum of platinum, palladium and alumina is 82.47 g per liter of the honeycomb carrier.

Comparative Example 1

21.8 g of an aqueous solution of dinitrodiamine platinum corresponding to 2.47 g of platinum and 80 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (D). A cylindrical honeycomb carrier made of cordierite of 24 mm in diameter and 50 mm in length having 400 cells per square inch of cross-sectional area was coated (wash coat) with this slurry, dried at 120° C. for 8 hours and then calcined at 500° C. for an hour to obtain catalyst D so that the sum of platinum and alumina is 82.47 g per liter of the honeycomb carrier.

Comparative Example 2

17.6 g of an aqueous solution of palladium nitrate corresponding to 2.47 g of palladium and 80 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (E). A cylindrical honeycomb carrier made of cordierite of 24 mm in diameter and 50 mm in length having 400 cells per square inch of cross-sectional area was coated (wash coat) with this slurry, dried at 120° C. for 8 hours and then calcined at 500° C. for an hour to obtain catalyst E so that the sum of palladium and alumina is 82.47 g per liter of the honeycomb carrier.

Evaluation Example 1

After catalysts A, B, C, D and E were calcined at 700° C. for 11 hours, a gas, wherein the composition was NO: 300 ppm, CO: 300 ppm, $O_2$: 6%, propane: 60 ppm (equivalent in methane), propylene: 240 ppm (equivalent in methane), $CO_2$: 6%, $H_2O$: 6% and nitrogen:balance (volume ratio), was passed over each catalyst as an exhaust gas at a S.V. (space velocity) of 70,000/hr. The concentration of nitrogen monoxide (NO) and the concentration of nitrogen dioxide ($NO_2$) were measured while the temperature at the catalyst inlet and in the catalyst bed was raised from 100° C. to 200° C. at a rate of 10° C. per minute. The calcination at 700° C. for 11 hours is a durable treatment for evaluating a catalyst performance after long-period use. The conversion ratio of NO to $NO_2$ was calculated by the following equation and plotted against the temperature at the catalyst-bed inlet. The results are shown in FIG. 1.

$$\text{Conversion Ratio (\%)} = \frac{NO_2 \text{ concentration after oxidation catalyst}}{NO \text{ concentration before oxidation catalyst}} \times 100$$

It can be seen from the above results that the oxidation catalyst of the present invention which contains a specific amount of Pd and Pt as catalytically active components shows a higher conversion ratio of NO to $NO_2$ than an oxidation catalyst which contains only Pt as a catalytically active component.

Example 4

26.4 g of an aqueous solution of dinitrodiamine platinum corresponding to 3 g of platinum, 7.13 g of an aqueous solution of palladium nitrate corresponding to 1 g of palladium and 120 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (F). A cylindrical honeycomb carrier made of cordierite of 1 inch in diameter and 3 inches in length having 400 cells per square inch of cross-sectional area was coated (wash coat) with this slurry, dried at 120° C. for 8 hours and then calcined at 500° C. for an hour to obtain catalyst F so that the sum of platinum, palladium and alumina is 124 g per liter of the honeycomb carrier.

Example 5

28.2 g of an aqueous solution of dinitrodiamine platinum corresponding to 3.2 g of platinum, 3.57 g of an aqueous solution of palladium nitrate corresponding to 0.5 g of palladium and 120 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (G). A cylindrical honeycomb carrier made of cordierite of 1 inch in diameter and 3 inches in length having 400 cells per square inch of cross-sectional area was coated (wash coat) with this slurry, dried at 120° C. for 8 hours and then calcined at 500° C. for an hour to obtain catalyst G so that the sum of platinum, palladium and alumina is 123.7 g per liter of the honeycomb carrier.

Example 6

29.3 g of an aqueous solution of dinitrodiamine platinum corresponding to 3.32 g of platinum, 1.43 g of an aqueous solution of palladium nitrate corresponding to 0.2 g of palladium and 120 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (H). A cylindrical honeycomb carrier made of cordierite of 1 inch in diameter and 3 inches in length having 400 cells per square inch of cross-sectional area was coated (wash coat) with this slurry, dried at 120° C. for 8 hours and then calcined at 500° C. for an hour to obtain catalyst H so that the sum of platinum, palladium and alumina is 123.52 g per liter of the honeycomb carrier.

Comparative Example 3

30.0 g of an aqueous solution of dinitrodiamine platinum corresponding to 3.4 g of platinum and 120 g of activated alumina ($\gamma$-$Al_2O_3$, BET specific surface area: 200 $m^2$/g, mean primary particle diameter: 6 μm) were subjected to wet milling by a ballmill to prepare 300 g in total of an aqueous slurry (I). A cylindrical honeycomb carrier made of cordierite of 1 inch in diameter and 3 inches in length having 400 cells per square inch of cross-sectional area was coated (wash coat) with this slurry, dried at 120° C. for 8 hours and then calcined at 500° C. for an hour to obtain catalyst I so that the sum of platinum and alumina is 123.4 g per liter of the honeycomb carrier.

Evaluation Example 2

After catalysts F, G, H and I were calcined at 700° C. for 16 hours, a gas, wherein the composition was NO: 175 ppm, CO: 20 ppm, $O_2$: 13.5%, propane: 18 ppm (equivalent in methane), propylene: 72 ppm (equivalent in methane), $CO_2$: 6%, $H_2O$: 5.1% and nitrogen:balance was passed over each catalyst as an exhaust gas at a S.V. (space velocity) of 45,000/hr. The conversion ratio of nitrogen monoxide (NO) to nitrogen dioxide ($NO_2$) was measured at 175° C. when the temperature of the gas was raised at a rate of 10° C. per minute. The results are shown in Table 1. The calcination at 700° C. for 16 hours is a durable treatment for evaluating a catalyst performance after long-period use.

TABLE 1

| Catalyst | Conversion Ratio of NO to $NO_2$ (%) |
|---|---|
| F | 17.3 |
| G | 31.9 |
| H | 34.7 |
| I | 3.9 |

It can be seen from the results of Evaluation Example 2 (Table 1) that even when an amount of the noble metals, a volume of the honeycomb carrier and exhaust-gas concentration are altered, the oxidation catalyst of the present invention which contains a specific amount of Pd and Pt as catalytically active components shows a higher conversion ratio of NO to $NO_2$ than an oxidation catalyst which contains only Pt as a catalytically active component.

Example 7

The aqueous slurry (F) was prepared in 15 times as many amounts by weight as that in Example 4. A cylindrical honeycomb carrier made of cordierite of 10.5 inches in diameter and 6 inches in length having 300 cells per square inch of cross-sectional area was coated (wash coat) with this slurry so that the sum of platinum, palladium and alumina is 124 g per liter of the honeycomb carrier, dried at 120° C. for 8 hours and then calcined at 500° C. for an hour to obtain catalyst J.

Comparative Example 4

The aqueous slurry (I) was prepared in 15 times as many amounts by weight as that in Comparative Example 3. A cylindrical honeycomb carrier made of cordierite of 10.5 inches in diameter and 6 inches in length having 300 cells per square inch of cross-sectional area was coated (wash coat) with this slurry so that the sum of platinum and alumina is 124 g per liter of the honeycomb carrier, dried at 120° C. for 8 hours and then calcined at 500° C. for an hour to obtain catalyst K.

Reference Example 1

An aqueous solution of iron nitrate of the amount corresponding to 48 g of iron and 1,600 g of MFI type zeolite (BET specific surface area: 380 m²/g, mean primary particle diameter: 15 µm) were subjected to wet milling by a ballmill to prepare 4,500 g in total of an aqueous slurry (L). A cylindrical honeycomb carrier made of cordierite of 10.5 inches in diameter and 6 inches in length having 400 cells per square inch of cross-sectional area was coated (wash coat) with this slurry so that the sum of iron and zeolite is 164.8 g per liter of the honeycomb carrier, dried at 120° C. for 8 hours and then calcined at 500° C. for an hour to obtain catalyst L.

Example 8

An exhaust-gas discharge apparatus was fabricated by installing catalyst J after an engine 1 and reduction catalyst L after the catalyst as shown in FIG. 2. A direct-injection diesel engine of 9.8 L was used as the internal-combustion engine.

Comparative Example 5

An exhaust-gas discharge apparatus was fabricated by installing catalyst K after an engine 1 and reduction catalyst L after the catalyst as shown in FIG. 2. A direct-injection diesel engine of 9.8 L was used as the internal-combustion engine.

Comparative Example 6

An exhaust-gas discharge apparatus was fabricated in the same way as Comparative Example 5 except that a cylindrical honeycomb carrier made of cordierite of 10.5 inches in diameter and 6 inches in length having 300 cells per square inch of cross-sectional area was installed instead of catalyst K. A direct-injection diesel engine of 9.8 L was used as the internal-combustion engine.

Evaluation Example 3

After catalysts J, K and reduction catalyst L were calcined at 700° C. for 50 hours, evaluation of the conversion ratios to $NO_2$ was carried out using the exhaust-gas discharge apparatuses of Example 8 and Comparative Example 5. The calcination at 700° C. for 50 hours is a durable treatment for evaluating a catalyst performance after long-period use. The engine was run so that the thermocouple 5 before the oxidation catalyst (the thermocouple 5 before the reduction catalyst in Comparative Example 6) indicated 400° C. and the exhaust gas was passed through the oxidation catalyst for 15 minutes. The engine was then run so that the thermocouple 5 before the oxidation catalyst indicates 180° C. on average and 200° C. on average, and an aqueous solution of urea of 32.5% by weight was added from the reducing agent injection nozzle 8 at a rate of 180 g per hour when the thermocouple 5 indicated 180° C. on average and 200 g per hour when the thermocouple 5 indicated 200° C. on average. The $NO_x$ concentration before the oxidation catalyst and after the reduction catalyst (before the honeycomb carrier and after the reduction catalyst in the case of Comparative Example 6) was measured at each temperature to calculate the $NO_x$ conversion ratio by the following equation. The results are shown in Table 2.

$$NO_x \text{ Conversion Ratio (\%)} = \frac{NO_x \text{ concentration after reduction catalyst}}{NO_x \text{ concentration before oxidation catalyst}} \times 100$$

TABLE 2

| | NO$_x$ Conversion Ratio [%] | | |
|---|---|---|---|
| Temperature before catalyst | Example 8 | Comparative Example 5 | Comparative Example 6 |
| 180° C. | 44.1 | 42.1 | 23.0 |
| 200° C. | 87.3 | 78.2 | 26.0 |

Example 9

The aqueous slurry (A) was prepared in 5 times as many amounts by weight as that in Example 1. A cylindrical honeycomb carrier made of cordierite of 5.7 inches in diameter and 6 inches in length having 400 cells per square inch of cross-sectional area was coated (wash coat) with this slurry so that the sum of platinum, palladium and alumina is 124 g per liter of the honeycomb carrier, dried at 120° C. for 8 hours and then calcined at 500° C. for an hour to obtain catalyst M.

Comparative Example 7

The aqueous slurry (D) was prepared in 5 times as many amounts by weight as that in Comparative Example 1. A cylindrical honeycomb carrier made of cordierite of 5.7 inches in diameter and 6 inches in length having 400 cells per square inch of cross-sectional area was coated (wash coat) with this slurry so that the sum of platinum and alumina is 124 g per liter of the honeycomb carrier, dried at 120° C. for 8 hours and then calcined at 500° C. for an hour to obtain catalyst N.

Example 10

An exhaust-gas discharge apparatus was fabricated by installing catalyst M after a direct-injection diesel engine of 2.2 L and a cylindrical diesel particulate filter made of SiC of 5.2 inches in diameter and 9 inches in length having 316 cells per square inch of cross-sectional area in which g of particulate matters discharged from the engine accumulated, after the catalyst.

Comparative Example 8

An exhaust-gas discharge apparatus was fabricated by installing catalyst N after a direct-injection diesel engine of 2.2 L and a cylindrical diesel particulate filter made of SiC of 5.2 inches in diameter and 9 inches in length having 316 cells per square inch of cross-sectional area in which 9 g of particulate matters discharged from the engine accumulated, after the catalyst.

Evaluation Example 4

The removal ratio of particulate matters was evaluated using the exhaust-gas discharge apparatuses of Example 10 and Comparative Example 7. The weight change of the diesel particulate filter from before to after the temperature indicated by the thermocouple before the oxidation catalyst was raised from 115° C. to 400° C. in 100 minutes was measured and thus the weight of the particulate matters remaining on the diesel particulate filter was calculated. The diesel particulate filter was weighed after it was dried at 150° C. for an hour. The removal ratio of particulate matters was determined from the weight of the remaining particulate matters using the following equation. The results are shown in Table 3.

Removal ratio of particulate matters (%) = 100 −

$$\frac{\text{Weight of remaining particulate matters after heated to 400° C.}}{9} \times 100$$

TABLE 3

| | Removal ratio of particulate matters (%) |
|---|---|
| Example 10 | 53% |
| Comparative Example 8 | 46% |

It can be seen from the results of Evaluation Example 4 (Table 3) that the catalyst of the present invention gives also a high removal ratio of the particulate matters accumulated in a diesel particulate filter.

Example 11

65.7 g of an aqueous solution of dinitrodiamine platinum corresponding to 7.4 g of platinum, 5.27 g of an aqueous solution of palladium nitrate corresponding to 0.74 g of palladium and 120 g of activated alumina ($\gamma$-$Al_2O_3$, BET specific surface area: 200 $m^2$/g, mean primary particle diameter: 6 µm) were subjected to wet milling by a ballmill to prepare 300 g in total of an aqueous slurry (O). A cylindrical honeycomb carrier made of cordierite of 24 mm in diameter and 67 mm in length having 400 cells per square inch of cross-sectional area was coated (wash coat) with this slurry, dried at 120° C. for 8 hours and then calcined at 500° C. for an hour to obtain catalyst O so that the sum of platinum, palladium and alumina is 32.04 g per liter of the honeycomb carrier.

Example 12

65.7 g of an aqueous solution of dinitrodiamine platinum corresponding to 7.4 g of platinum, 2.64 g of an aqueous solution of palladium nitrate corresponding to 0.37 g of palladium and 120 g of activated alumina ($\gamma$-$Al_2O_3$, BET specific surface area: 200 $m^2$/g, mean primary particle diameter: 6 µm) were subjected to wet milling by a ballmill to prepare 300 g in total of an aqueous slurry (P). A cylindrical honeycomb carrier made of cordierite of 24 mm in diameter and 67 mm in length having 400 cells per square inch of cross-sectional area was coated (wash coat) with this slurry, dried at 120° C. for 8 hours and then calcined at 500° C. for an hour to obtain catalyst P so that the sum of platinum, palladium and alumina is 31.94 g per liter of the honeycomb carrier.

Example 13

65.7 g of an aqueous solution of dinitrodiamine platinum corresponding to 7.4 g of platinum, 1.32 g of an aqueous solution of palladium nitrate corresponding to 0.19 g of palladium and 120 g of activated alumina ($\gamma$-$Al_2O_3$, BET specific surface area: 200 $m^2$/g, mean primary particle diameter: 6 µm) were subjected to wet milling by a ballmill to prepare 300 g in total of an aqueous slurry (Q). A cylindrical honeycomb carrier made of cordierite of 24 mm in diameter and 67 mm in length having 400 cells per square inch of cross-sectional area was coated (wash coat) with this slurry, dried at 120° C. for 8 hours and then calcined at 500° C. for an hour to obtain catalyst Q so that the sum of platinum, palladium and alumina is 31.90 g per liter of the honeycomb carrier.

Example 14

65.7 g of an aqueous solution of dinitrodiamine platinum corresponding to 7.4 g of platinum, 0.66 g of an aqueous solution of palladium nitrate corresponding to 0.093 g of palladium and 120 g of activated alumina ($\gamma$-$Al_2O_3$, BET specific surface area: 200 $m^2$/g, mean primary particle diameter: 6 µm) were subjected to wet milling by a ballmill to prepare 300 g in total of an aqueous slurry (R). A cylindrical honeycomb carrier made of cordierite of 24 mm in diameter and 67 mm in length having 400 cells per square inch of cross-sectional area was coated (wash coat) with this slurry, dried at 120° C. for 8 hours and then calcined at 500° C. for an hour to obtain catalyst R so that the sum of platinum, palladium and alumina is 31.87 g per liter of the honeycomb carrier.

Comparative Example 9

65.7 g of an aqueous solution of dinitrodiamine platinum corresponding to 7.4 g of platinum and 120 g of activated alumina ($\gamma$-$Al_2O_3$, BET specific surface area: 200 $m^2$/g, mean primary particle diameter: 6 µm) were subjected to wet milling by a ballmill to prepare 300 g in total of an aqueous slurry (S). A cylindrical honeycomb carrier made of cordierite of 24 mm in diameter and 67 mm in length having 400 cells per square inch of cross-sectional area was coated (wash coat) with this slurry, dried at 120° C. for 8 hours and then calcined at 500° C. for an hour to obtain catalyst S so that the sum of platinum and alumina is 31.85 g per liter of the honeycomb carrier.

Evaluation Example 5

After catalysts O, P, Q, R and S were calcined at 700° C. for 50 hours, a gas, wherein the composition was NO: 175 ppm, CO: 20 ppm, $O_2$: 13.5%, propane: 18 ppm (equivalent in methane), propylene: 72 ppm (equivalent in methane), $CO_2$: 6%, $H_2O$: 5.1% and nitrogen:balance was passed over each catalyst as an exhaust gas at a S.V. (space velocity) of 45,000/hr. The conversion ratio of nitrogen monoxide (NO) to nitrogen dioxide ($NO_2$) was measured at 200° C. The results are shown in Table 4. The calcination at 700° C. for 50 hours is a durable treatment for evaluating a catalyst performance after long-period use.

TABLE 4

| Catalyst | Conversion Ratio of NO to $NO_2$ (%) |
|---|---|
| O | 22.4 |
| P | 21.0 |
| Q | 19.7 |
| R | 19.2 |
| S | 18.0 |

The present application is based on JP-Application Number-2006-322490 filed on Sep. 21, 2006, the entire contents of which are hereby incorporated by reference.

What is claimed is:

1. A process for purifying an exhaust gas discharged from an internal-combustion engine, comprising (1) a step for converting nitrogen monoxide in the exhaust gas to nitrogen dioxide by bringing the above exhaust gas into contact with an oxidation catalyst comprising platinum and palladium as catalytically active components, which promotes oxidation of nitrogen monoxide to nitrogen dioxide, wherein the oxidation catalyst comprises 1 to 55 parts by weight of the palladium relative to 100 parts by weight of the platinum, and (2) a step for reducing the nitrogen oxides in the exhaust gas by bringing the exhaust gas obtained in the step (1) into contact with a $NO_x$ reduction catalyst in the presence of a reducing agent, wherein x is 1 or 2.

2. The process according to claim 1, further comprising (3) a step for removing at least a part of particulate matters.

3. The process according to claim 2, wherein the three-dimensional structure is a honeycomb structure.

4. The process according to claim 3, further comprising (3) a step for removing at least a part of particulate matters.

5. The process according to claim 1, wherein the catalytically active components are supported on a refractory inorganic oxide to form a catalytically active component-supporting inorganic oxide which is further supported on a three-dimensional structure.

6. The process according to claim 5, wherein the refractory inorganic oxide is at least one member selected from the group consisting of activated alumina, alumina-silica, zirconia, titania and zeolite.

7. The process according to claim 6, further comprising (3) a step for removing at least a part of particulate matters.

8. The process according to claim 5, further comprising (3) a step for removing at least a part of particulate matters.

* * * * *